(12) United States Patent
Kobayashi et al.

(10) Patent No.: US 6,616,879 B1
(45) Date of Patent: Sep. 9, 2003

(54) METHODS FOR PRODUCING MULTILAYER MOLDED ARTICLES

(75) Inventors: Yoshitaka Kobayashi, Ibaraki (JP); Nobuhiro Usui, Takatsuki (JP); Takeo Kitayama, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/586,965

(22) Filed: Jun. 5, 2000

(30) Foreign Application Priority Data

Jun. 7, 1999 (JP) .......................... 11-159556

(51) Int. Cl.$^7$ .................. B29C 43/18; B29C 45/14
(52) U.S. Cl. .................. 264/266; 264/259; 264/321
(58) Field of Search ................ 264/46.4, 259, 264/266, 321

(56) References Cited

U.S. PATENT DOCUMENTS

| | | | | |
|---|---|---|---|---|
| 4,873,045 A | * | 10/1989 | Fujita et al. | 264/259 |
| 4,923,653 A | * | 5/1990 | Matsuura et al. | 264/40.3 |
| 4,959,184 A | * | 9/1990 | Akai et al. | 264/40.3 |
| 4,976,414 A | * | 12/1990 | Yanagishita | 264/40.3 |
| 5,281,376 A | * | 1/1994 | Hara et al. | 264/46.4 |

OTHER PUBLICATIONS

Patent Abstract of Japan of JP–S60–212342–A, Oct., 1985.
Patent Abstract of Japan of JP–S61–14944–A, Jan., 1986.

\* cited by examiner

*Primary Examiner*—Allan R. Kuhns
(74) *Attorney, Agent, or Firm*—Fitch, Even, Tabin & Flannery

(57) ABSTRACT

The present invention provides a method for producing a multilayer molded article comprising a step of supplying a skin material having at least a foam layer between a pair of a male mold half and a female mold half, supplying a molten thermoplastic resin between the skin material and the molding surface of one of the male mold half and the female mold half, a step of laminating the skin material onto at least a part of the surface of a substrate made from the thermoplastic resin and a step of forming a recess in the skin material laminating region, wherein the thickness, t (mm), of the foam layer in the skin material before molding is 0.6 R or less wherein R represents the minimum radius (mm) of the recess on the skin material laminating side of the substrate in the skin material laminating region of the multilayer molded article.

4 Claims, 4 Drawing Sheets

METHODS FOR PRODUCING MULTILAYER MOLDED ARTICLES

BACKGROUND OF THE INVENTION

1. Field of the Invention

The present invention relates to a method for producing a multilayer molded article formed by laminating a skin material onto at least a part of the surface of a substrate made from a thermoplastic resin.

2. Description of the Prior Art

A multilayer molded article formed by laminating a skin material having a foam layer onto at least a part of the surface of a substrate made from a thermoplastic resin is used widely in various industrial fields including automobile interior parts (for example, door trim and instrument panel) and interior and exterior parts of domestic electrical appliances.

As a conventional method for producing a multilayer molded article described above, a method in which a skin material is adhered or laminated using an adhesive onto a molded article (substrate) which had previously been formed from a thermoplastic resin by various methods such as an injection molding and an injection press molding and a method in which a skin material is supplied between a pair of mold halves and then a molten thermoplastic resin is supplied to be molded into an intended shape while laminating the skin material onto at least a part of the surface of the substrate are known.

However, the former involved a problematically complicated manufacturing process as well as hazards to human health and environment attributable to the solvents contained in adhesives, while the latter undergoes a compression of a foam layer in the skin material, due to a force by which the skin material is pressed strongly against the surface of the mold half when a molten thermoplastic resin supplied to the molds is molded, resulting in a wrinkle on the surface of the skin material of a molded article obtained, especially when producing a product having a recess on the skin material side in the skin laminating part, which leads to a poor appearance, although it is advantageous in that the skin material can be laminated onto the surface of the substrate at the same time with the molding of the substrate.

SUMMARY OF THE INVENTION

We made an effort to develop a method for producing a multilayer molded article having a recess on the skin material side in the skin material laminating region while utilizing an advantageous property possessed by an injection molding and an injection press molding which is the ability of laminating a skin material onto the surface of the substrate at the same time with the molding of the substrate without forming a wrinkle on the surface of the skin material, even when a skin material having a foam layer is employed, which leads to a poor appearance, and finally discovered that the relationship between the thickness of the foam layer in the skin material supplied and the minimum radius R of the recess on the skin material laminating side of the substrate in the skin material laminating region of the multilayer molded article is extremely important, thus establishing the present invention.

Thus, the present invention provides a method for producing a multilayer molded article comprising a step of supplying a skin material having at least a foam layer between a pair of a male mold half and a female mold half, supplying a molten thermoplastic resin between the skin material and the molding surface of one of the male mold half and the female mold half, a step of laminating the skin material onto at least a part of the surface of a substrate made from the thermoplastic resin and a step of forming a recess in the skin material laminating region, wherein the thickness, t (mm), of the foam layer in the skin material before molding is 0.6 R or less wherein R represents the minimum radius (mm) of the recess on the skin material laminating side of the substrate in the skin material laminating region of the multilayer molded article.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

Figure 1:
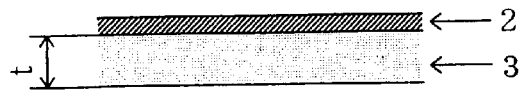
FIG. 1 shows a schematic sectional view of a skin material employed in the invention.

A method for producing a multilayer molded article according to the invention is described below.

A method according to the invention may be any method provided that it is a method for producing a multilayer molded article comprising a step of supplying a skin material having at least a foam layer between a pair of a male mold half and a female mold half, a step of supplying a molten thermoplastic resin between the skin material and the molding surface of one of the male mold half and the female mold half, a step of laminating the skin material onto at least a part of the surface of a substrate made from the thermoplastic resin and a step of forming a recess in the skin material laminating region, and the method itself is not particularly limited, but it is important in the invention that the thickness, t (mm), of the foam layer in the skin material before molding is 0.6 R or less wherein R represents the minimum radius (mm) of the recess on the skin material laminating side of the substrate in the skin material laminating region of the multilayer molded article.

In a skin material having at least a foam layer employed in the invention, the foam layer is not particularly limited, and may for example be a rigid or semi-rigid polyurethane foam, a polypropylene foam, a polyethylene foam, a polyvinyl chloride foam and the like. While such foam layer may be of any density (expansion magnification), an urethane foam having a density of 0.02 to 0.08 g/cm$^3$ is employed preferably.

When employing a skin material, it is essential that the thickness, t (mm), of the foam layer in the skin material is 0.6 R or less wherein R represents the minimum radius (mm) of the recess on the skin material laminating side of the substrate in the skin material laminating region of an intended multilayer molded article, and the thickness is selected to satisfy the relationship described above depending on the shape of the intended multilayer molded article.

While a skin material is pressed against the surface of the mold half strongly to compress a foam layer when a molten thermoplastic resin supplied to mold halves is formed into a shape, a thickness, t (mm), of the foam layer in the skin material employed which is more than 0.6 R or less wherein R represents the minimum radius (mm) of the recess on the skin material laminating side of the substrate in the skin material laminating region of the multilayer molded article enables a recovery of the foam layer from its previously compressed shape, whereby allowing the side of the surface of the skin material to be loosen, thus occuring a wrinkling.

While it is essential for a skin material employed in the invention to have a foam layer described above, the skin material may consist only of such foam layer or may further be laminated with a skin layer, or may be lined with a lining layer.

A skin layer may for example be a woven fabric or a knitted fabric such as a moquette and a tricot, an unwoven fabric such as a needle punch carpet, a metal foil, a sheet or a film made from a synthetic resin such as a thermoplastic resin and a thermoplastic elastomer.

A lining layer may for example be a sheet or a film made from an unwoven fabric or a synthetic resin.

A fiber constituting an unwoven fabric may for example be a natural fiber such as a cotton, a wool, a silk and a linen or a synthetic fiber such as a polyamide, a polyester and a nylon, which is used alone or mixed-spun by various methods to form an unwoven fabric to be used in the invention, and those also exemplified are needle punch, thermal bond, spun bond, melt blow and span lace types of the unwoven fabrics.

A sheet or a film made from a synthetic resin may for example be a sheet or film made from a thermoplastic resin such as a polypropylene and a polyethylene or thermoplastic elastomer such as a polyolefinic thermoplastic elastomer, and a material having an ability of fusing with a thermoplastic resin employed as a substrate is employed preferably.

A thermoplastic resin employed in the invention may be any thermoplastic resin employed usually in an extrusion molding, an injection molding, a press molding and the like, and includes, for example, an ordinary thermoplastic resin such as a polyethylene, a polypropylene, an acrylonitrile-styrene-butadiene copolymer, a polystyrene, a polyamide such as a nylon, a polyvinyl chloride, a polycarbonate, an acrylic resin, a styrene-butadiene block copolymer and the like, a thermoplastic elastomer such as EPM and EPDM, a mixture thereof or a polymer alloy made therefrom, which may be expandable or non-expandable.

A thermoplastic resin described above may also contain a reinforcing fiber such as a glass fiber usually employed if necessary as well as a filler such as various inorganic or organic fillers, in addition to various additives employed usually including a pigment, a glidant, an antistatic agent and a stabilizer.

While the importance is attached in the invention to the relationship between the thickness of the foam layer in the skin material supplied and the minimum radius R of the recess on the skin material laminating side of the substrate in the skin material laminating region of the multilayer molded article intended and any method such as an injection molding or a compression molding may be employed as long as it is a method for producing a multilayer molded article comprising a step of supplying a skin material having at least a foam layer between a pair of a male mold half and a female mold half, a step of supplying a molten thermoplastic resin between the skin material and the molding surface of one of the male mold half and the female mold half, a step of laminating the skin material onto at least a part of the surface of a substrate made from the thermoplastic resin and a step of forming a recess in the skin material laminating region. Preferably, a compression molding in which its mold halves are unclosed during a supply of a molten thermoplastic resin and then the mold halves are clamped after or at the same time of the completion of the supply of the molten thermoplastic resin whereby reducing a damage to the skin material is employed rather than an injection molding in which a skin material is exposed directly to the heat and the pressure of a molten thermoplastic resin upon the supply of a molten thermoplastic resin whereby increasing a damage to the skin material.

A compression molding which is a representative production method of the invention is exemplified below to explain the method of the present invention with referring to drawings.

Figure 2:
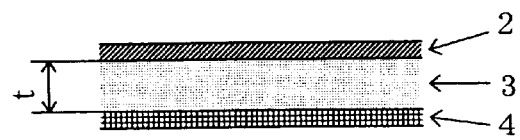
FIG. 2 shows a schematic sectional view of another skin material employed in the invention.

Each of FIG. 1 and FIG. 2 shows the sectional view of an example of skin material (1) employed in the invention, and the skin material in FIG. 1 consists of skin layer (2) and foam layer (3) and the skin material in FIG. 2 consists of skin layer (2), foam layer (3) and lining layer (4).

Figure 3:
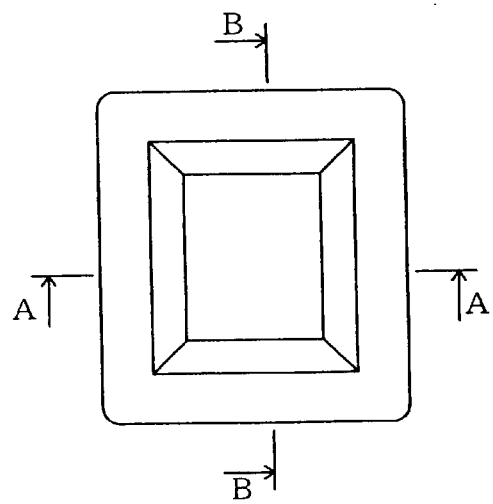
FIG. 3 shows a planar view of a multilayer molded article having a skin material laminated entirely and recesses on the skin material laminating side of a substrate.
Figure 4:
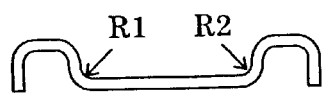
FIG. 4 shows a sectional view only of the substrate region when the multilayer molded article shown in FIG. 3 is cut along with a line A—A.
Figure 5:
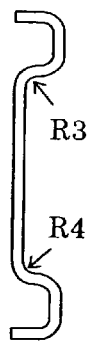
FIG. 5 shows a sectional view only of the substrate region when the multilayer molded article shown in FIG. 3 is cut along with a line B—B.

FIG. 3 shows a planar view of a multilayer molded article having a skin material laminated entirely and recesses on the skin material laminating region of the substrate, and FIG. 4 shows a sectional view only of the substrate region when the multilayer molded article shown in FIG. 3 is cut along with a line A—A, and FIG. 5 shows a sectional view only of the substrate region when the multilayer molded article shown in FIG. 3 is cut along with a line B—B.

Recesses are formed on the skin material laminating side of the substrate in the skin material laminating region of the multilayer molded article, and their respective minimum radiuses Rs are R1, R2, R3 and R4, and the minimum radius R (mm) of each recess and the thickness, t (mm), of the foam layer in the skin material for producing the multilayer molded article are in the relationship represented by $t \leq 0.6 R$.

Figure 6:
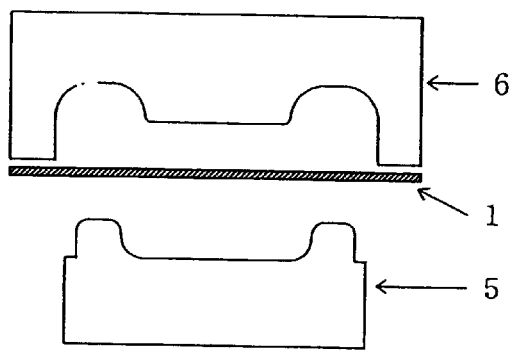
FIG. 6 shows a schematic sectional view of mold halves in a manufacturing step according to the invention.

FIG. 6 shows skin material (1) having a foam layer supplied between a pair of a male mold half and a female mold half (5, 6) which are unclosed now.

For supplying a skin material, the skin material may be mounted on the molding side of one half of the mold halves (for example on the molding side of the male mold half in the case of the mold halves shown in FIG. 6), or it may be fixed using a pin or equivalent to a male mold half or a female mold half itself or to a skin material fixing frame provided around a mold half, and FIG. 6 shows the case in which a skin material is fixed between the mold halves using such fixing means.

A skin material may be pre-heated or pre-molded depending on the product shape.

Figure 7:
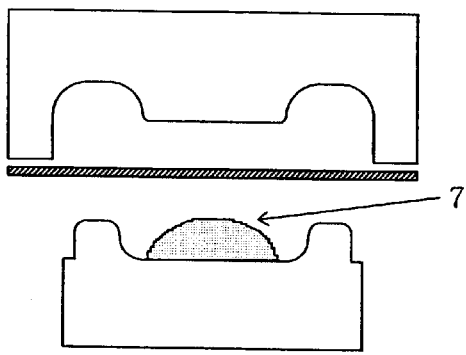
FIG. 7 shows a schematic sectional view of mold halves in a manufacturing step according to the invention.

FIG. 7 shows molten thermoplastic resin (7) supplied between a skin material, which has already been supplied between the mold halves, and the molding side of a mold half (the molding side of the male mold half in this figure).

While a method for supplying a molten thermoplastic resin may be a internal supply method in which a molten resin is injected into a cavity via a passage provided in a mold half or an external supply method in which a molten resin is supplied into a cavity from an appropriate supplying device out of a mold half, an internal supply method is preferred when taking the operability and the cooling of supplied molten resin into consideration.

Figure 8:
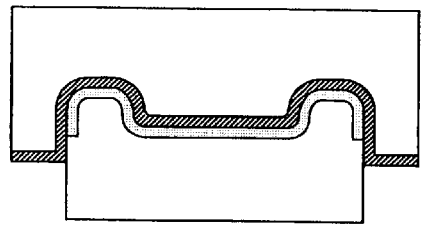
FIG. 8 shows a schematic sectional view of mold halves in a manufacturing step according to the invention.

FIG. 8 shows the male mold half and the female mold half which are now clamped after the supply of the molten thermoplastic resin described above, and this clamping step molds the thermoplastic resin into the shape of the substrate simultaneously with laminating the skin material onto the substrate.

While the direction of the clamping is vertical in this figure, it is not limited particularly and may be lateral in some mold halves.

When a molten thermoplastic resin is supplied by an internal supply method, the clamping may be initiated after the supply of the molten thermoplastic resin, or may be performed upon completion of the supply or simultaneously with the supply of the molten thermoplastic resin, or the clamping may be completed simultaneously with the completion of or after the completion of the supply of the molten thermoplastic resin.

Figure 9:
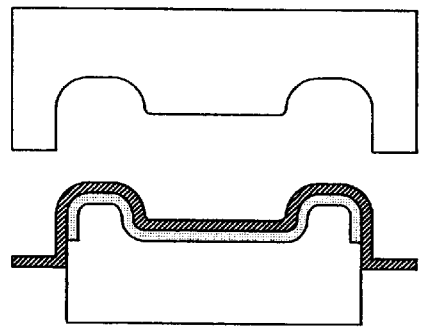
FIG. 9 shows a schematic sectional view of mold halves in a manufacturing step according to the invention.
Figure 10:
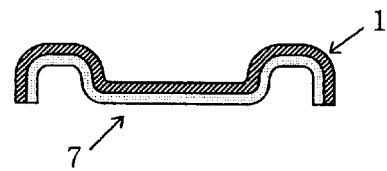
FIG. 10 shows a sectional view of a multilayer molded article in which a skin material is laminated onto the entire surface of a substrate.

After completing a clamping, the molten thermoplastic resin is cooled and solidified in the mold halves which are kept as being clamped, and thereafter the mold halves are unclosed (FIG. 9) to take the molded article out, whereby yielding a multilayer molded article in which skin material (1) is laminated onto the surface of the substrate made from thermoplastic resin (7) as indicated in FIG. 10.

Figure 11:
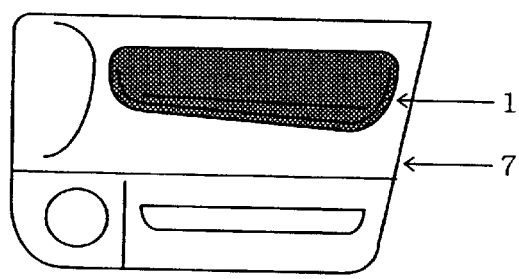
FIG. 11 shows a sectional view of a multilayer molded article in which a skin material is laminated onto a part of a substrate.

While an article having a skin material laminated onto the entire surface of a substrate is exemplified here, a multilayer molded article having a skin material laminated onto a part of the surface of a substrate, as indicated in FIG. 11, may also be produced similarly by appropriately selecting the shape of a product and the laminating position, the corresponding supplying position and the size of the skin material.

The method of the present invention allows, when producing a multilayer molded article having a recess on the skin material side in the skin material laminating region while utilizing an advantageous property possessed by an injection molding and an injection press molding which is the ability of laminating a skin material onto the surface of the substrate at the same time with the molding of the substrate, a multilayer molded article having no wrinkles on the surface of the skin material and having a satisfactory appearance to be obtained even when a skin material having a foam layer is employed.

What is claimed is:

1. A method for producing a multilayer molded article comprising a step of supplying a skin material having at least a foam layer between a pair of a male mold half and a female mold half, a step of supplying a molten thermoplastic resin between the skin material and the molding surface of one of the male mold half and the female mold half, a step of laminating the skin material onto at least a part of the surface of a substrate made from the thermoplastic resin and a step of forming a recess in the skin material laminating region, wherein the thickness, t (mm), of the foam layer in the skin material before molding is 0.6 R or less wherein R represents the minimum radius (mm) of the recess on the skin material laminating side of the substrate in the skin material laminating region of the multilayer molded article.

2. The method for producing a multilayer molded article according to claim 1, wherein the foam layer is an urethane foam.

3. The method for producing a multilayer molded article according to claim 1, wherein supplying the molten thermoplastic resin is performed when the mold halves are unclosed, and laminating the skin material onto at least a part of the surface of the substrate is performed by clamping the mold halves after or at the same time of the completion of the supply of the molten thermoplastic resin.

4. The method for producing a multilayer article according to claim 1, wherein said supplying said molten resin comprises injecting said molten resin.

\* \* \* \* \*